United States Patent [19]

Nakahara et al.

[11] Patent Number: 5,038,236
[45] Date of Patent: Aug. 6, 1991

[54] MAGNETIC TAPE CASSETTE EJECTING DEVICE

[75] Inventors: Yasuyuki Nakahara; Masaru Uno, both of Nagano, Japan

[73] Assignee: K.K. Sankyo Seiki Seisakusho, Nagano, Japan

[21] Appl. No.: 379,849

[22] Filed: Jul. 14, 1989

[30] Foreign Application Priority Data

Jul. 19, 1988 [JP] Japan .................. 63-179458

[51] Int. Cl.⁵ .............................................. G11B 5/008
[52] U.S. Cl. ................................................. 360/96.5
[58] Field of Search .......................... 360/96.5, 96.6

[56] References Cited

U.S. PATENT DOCUMENTS

| 4,802,037 | 1/1989 | Tanaka | 360/96.5 |
| 4,802,039 | 1/1989 | Hatanaka | 360/96.5 |

Primary Examiner—A. J. Heinz
Attorney, Agent, or Firm—Sughrue, Mion, Zinn, Macpeak & Seas

[57] ABSTRACT

A magnetic tape cassette ejecting device, which includes a holder carriage holding a cassette to be moved between a recording and reproducing position and a cassette insertion and removal position. The ejecting device also includes an arm which is swung with the displacement of the holder carriage, a reversing lever engaged with the swing arm which is turned as the arm swings, and a reversing spring interposed between the reversing lever and a swingable fulcrum lever. The fulcrum lever is integral with a cassette ejection arm and operates to urge the ejection arm in a cassette removal direction when the holder carriage is at the cassette insertion and removal position. The fulcrum also urges the ejection arm in the opposite direction when, inserting the cassette, the cassette's front end contacts the ejection arm to turn it, thereby urging the eject arm in the cassette removal direction again when after insertion of the cassette, the holder carriage has been moved to the recording and reproducing position.

10 Claims, 4 Drawing Sheets

MAGNETIC TAPE CASSETTE EJECTING DEVICE

BACKGROUND OF THE INVENTION

This invention relates to magnetic tape cassette ejecting devices for tape recorders, and more particularly to a magnetic tape cassette ejecting device for digital audio tape recorders.

There are available a variety of magnetic tape recorders, and many of them use magnetic tape cassettes in which magnetic tapes are accommodated as recording media. A magnetic tape recording using such a magnetic tape cassette has a cassette loading device for loading a magnetic tape cassette in position for recording or reproducing signals, and a cassette ejecting device for removing the cassette therefrom.

A variety of cassette ejecting devices have been proposed in the art, and almost all of them are designed as follows: A cassette case holding a magnetic tape cassette is rotatably held, and is urged to turn to open its cover. The cassette case has a locking part, which is engaged with an ejecting button so that the cassette case is held at a cover closing position. The ejecting button is operated to disengage from the locking part, so that the cassette case is turned by the energizing force to open its cover. A typical example of the cassette ejecting device thus designed has been disclosed by Examined Japanese Utility Model Publication 32889/1979.

The above-described conventional cassette ejecting device suffers from a difficulty that, when it is required to remove the magnetic tape cassette from the cassette case set at the cover opening position, it is rather difficult to take out the cassette because the latter is accommodated inside the cassette case.

In order to overcome the difficulty, there has been proposed a magnetic tape cassette ejecting device which is so designed that the magnetic tape cassette is pushed in the cassette removal direction. However, the device is still disadvantageous in that, in order to build up an elastic force to remove the cassette in inserting it, it is necessary to insert the cassette with a relatively large force; that is, the device is low in operability.

In addition, there has been available a magnetic tape cassette ejecting device in which an electric motor is employed to load the cassette with relatively small force. However, it is also disadvantageous in that it is intricate in construction, high in manufacturing cost, and loading the cassette takes a relatively long time.

SUMMARY OF THE INVENTION

Accordingly, an object of the invention is to eliminate the above-described difficulties accompanying a conventional magnetic tape cassette ejecting device. More specifically, an object of the invention is to provide a magnetic tape cassette ejecting device high in operability with which a magnetic tape cassette can be loaded with a relatively small force without use of an electric motor, and in ejection of the cassette, the latter is urged so as to be removed therefrom with ease.

The foregoing object and other objects of the invention have been achieved by the provision of a magnetic tape cassette ejecting device which, according to the invention, comprises: cassette holding means for holding a cassette, in which a magnetic tape is accommodated, so as to move the cassette between a magnetic tape recording and reproducing position and a cassette insertion and removal position; cassette removing means for urging the cassette at the cassette insertion and removal position so as to remove the cassette from the cassette holding means; energizing means for providing an energizing force for the cassette removing means; and energization of the cassette removing means provide by the energizing means while the cassette being inserted in the cassette holding means, and reversing the direction of energization of the energizing means again so as to remove the cassette while the cassette holding means being displaced from the cassette insertion and removal position to the magnetic tape recording and reproducing position.

The nature, principle and utility of the invention will become more apparent from the following detailed description and the appended claims when read in conjunction with the accompanying drawings.

DETAILED DESCRIPTION OF THE INVENTION

Figure 1:
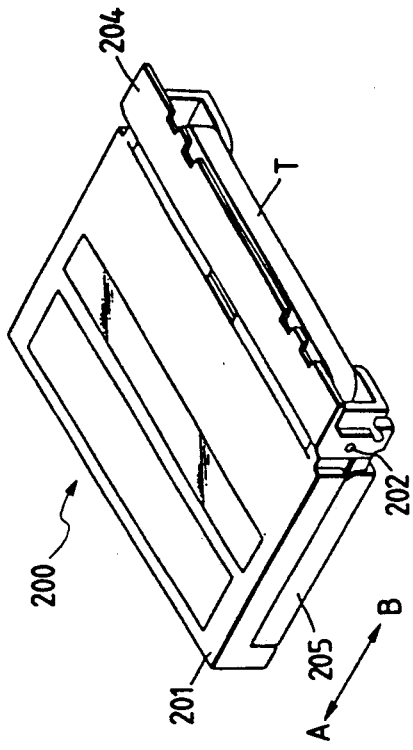
FIG. 1 is a perspective view showing one example of a magnetic tape cassette employed in a magnetic tape cassette ejecting device according to this invention.
Figure 2:
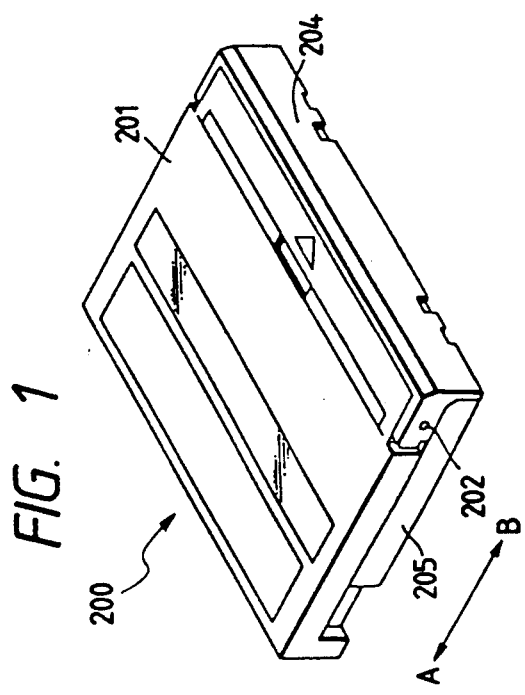
FIG. 2 is a perspective view showing the bottom of the magnetic tape cassette.
Figure 3:
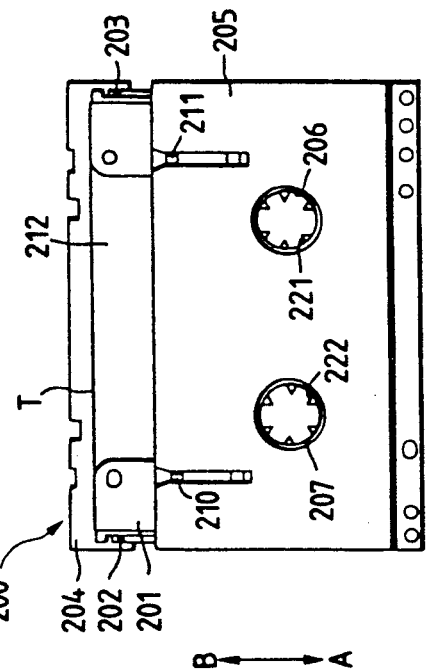
FIG. 3 is a perspective view showing the magnetic tape cassette with its front cover opened.

One example of a magnetic tape cassette ejecting device of the invention will be described which is applied to a digital audio tape recorder (DAT).

First, a magnetic tape cassette for a digital audio tape recorder will be described with reference to FIGS. 1 through 4. As shown in these figures, the magnetic tape cassette 200 has a supply reel and take-up reel on which a magnetic tape T is wound. A front cover 204 is rotatably mounted on the front end of a cassette body 201 through pins 202 and 203. A slider 205 is provided on the bottom of the cassette body 201 in such a manner that it is slidable in two opposite directions A and B as indicated by the arrow A-B. When the slider 205 is moved in the direction A, holes 206 and 207 formed in the slider 205 are coincided with hub-inserting holes 208 and 209 formed in the cassette body 201, so that the reel shafts can be engaged with the hub 222 of the supply reel and the hub 221 of the take-up reel through the holes thus coincided, respectively. The slider 205 is urged in the direction B so that it is locked by slider locking mechanisms 210 and 211 at the ends of movement in the directions A and B.

Figure 4:
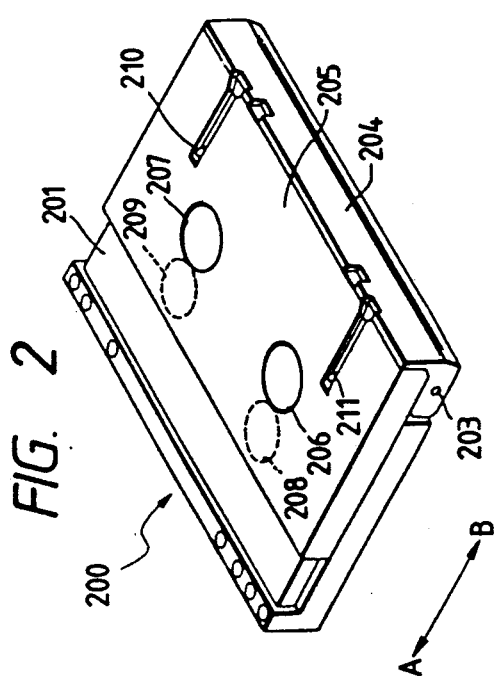
FIG. 4 is a bottom view of the magnetic tape cassette.

As shown in FIG. 4, an opening 212 is formed in the front end portion of the cassette body 201. The opening 212 is covered with the slider 205 and the front cover 204. When the slider 205 is slid in the direction A and the front cover 204 is swung, the opening 212 is opened, and the magnetic surface of the magnetic tape T is exposed outside.

Figure 5:
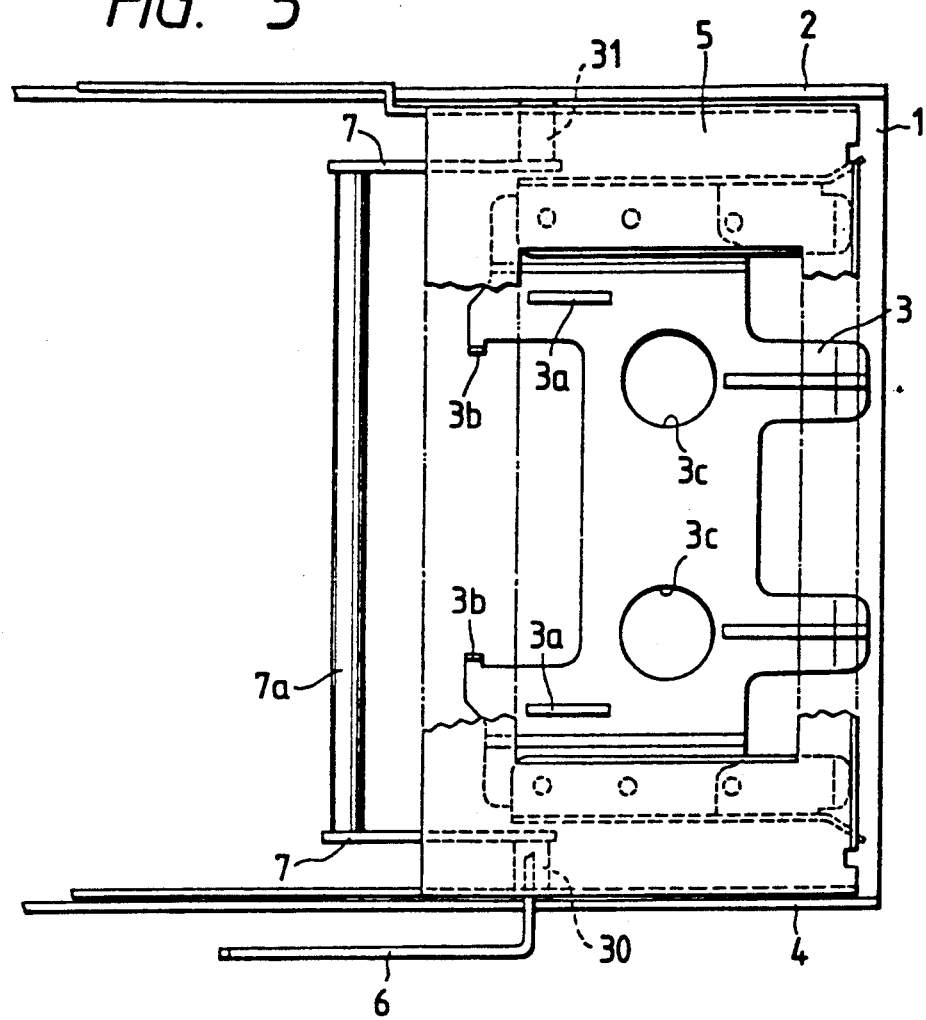
FIG. 5 is a plan view showing one example of the magnetic tape cassette ejecting device according to the invention.
Figure 6:
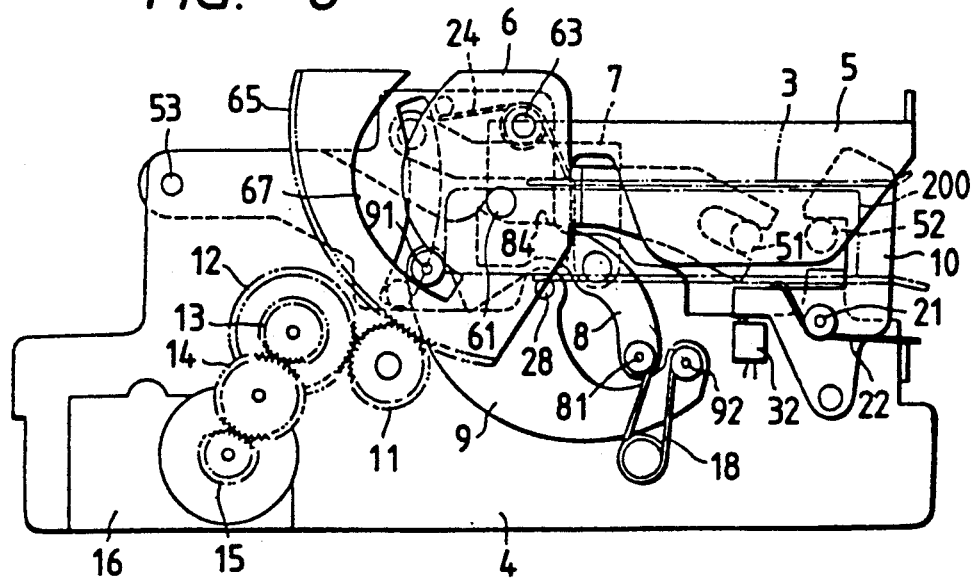
FIG. 6. is a side view of the magnetic tape cassette ejecting device with its holder carrier set at the recording and reproducing position.
Figure 7:
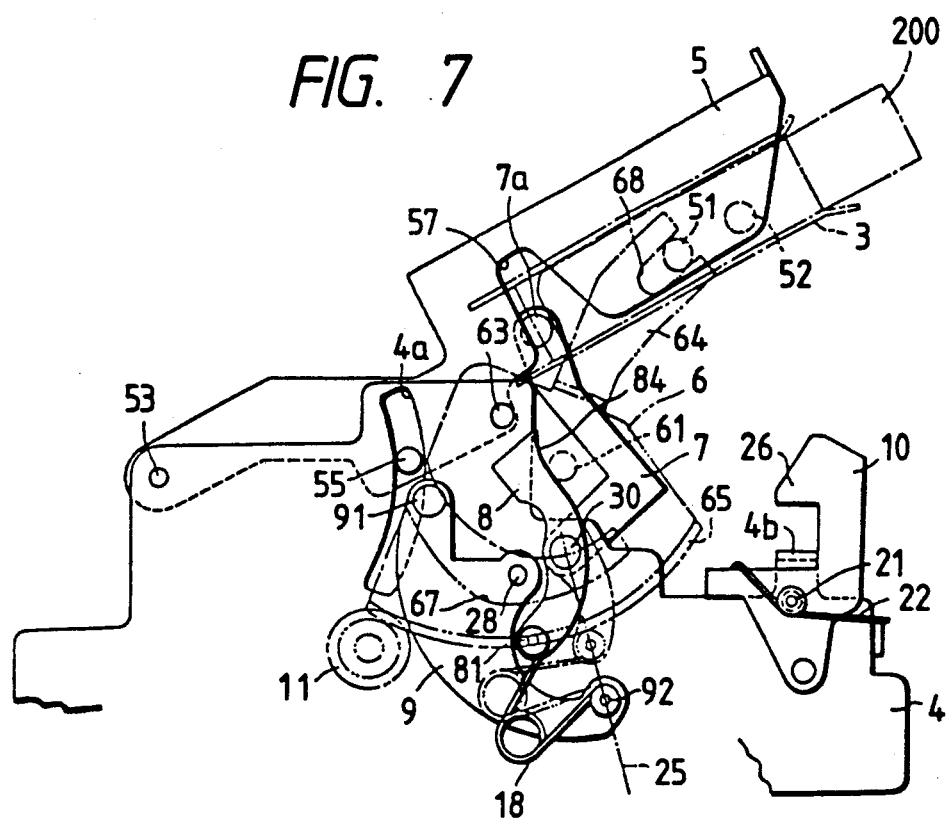
FIG. 7 is a side view of the magnetic tape cassette ejecting device with its holder carrier set at the cassette insertion and removal position.

FIGS. 5 through 8 show one example of a magnetic tape cassette ejecting device applied to the above-described cassette 200. In FIGS. 5 through 8, the front end of a mechanical chassis 1 is pictured on the right side, and the chassis has side chassis 2 and 4 extended perpendicularly. A shaft 53 is supported by the upper parts of the rear end portions of the side chassis 2 and 4. The rear end portion of a holder carriage 5 is supported on the shaft 53 in such a manner that the holder carriage 5 is located between the side chassis 2 and 4. The holder carriage 5 holds a cassette holder 3, and under this condition it is swung. More specifically, the holder carriage 5 is swung between a recording and reproducing position where it is held horizontal as shown in FIG. 6 and a cassette insertion and removal position where it is inclined as shown in FIG. 7. The side chassis 4 has an arcuate groove 4a, with which a pin 55 of the holder carriage 5 is engaged to determined the range of swing of the holder carriage 5.

The cassette holder 3 is supported by a suitable supporting mechanism in such a manner that it is movable vertically with respect to the holder carriage 5 and is urged downwardly. The cassette holder 3 is in the form of a frame so as to receive the tape cassette 200 therein and remove it therefrom. The cassette holder 3 has holes 3c in the bottom into which the reel shafts are inserted. In addition, embosses 3a are formed in the bottom of the cassette holder 3, to push and release the slider locking mechanisms 210 and 211 when the cassette 200 is inserted; and pawls 3b are provided at the end of the bottom. The pawls 3b are engaged with the front end of the slider 205, to move the slider 205 relative to the cassette body 201.

The side chassis 4 is provided with a swing arm 6 outside of it in such a manner that the swing arm 6 is swingable about a shaft 63 in a plane parallel with the side chassis 4. The swing arm 6 comprises a sector-shaped gear 65 extended like an arc with the shaft 63 as the center, and an arm 64. The arm 64 is bent like a crank, and is extended in the space between the side of the holder carriage 5 and the side of the cassette holder 3 passing through a cut 57 formed in the side of the holder carriage 5. The end portion of the arm 64 is formed into a two-prong fork 68, which is engaged with a roller 51 mounted on the holder carriage 5. The swing arm 6 is urged counterclockwise, in FIG. 6, by a spring 24 wound on the shaft 63. The elastic force of the spring 24 is transmitted through the fork 68 and the roller 51 to the holder carriage 5, so that the latter 5 is also urged counterclockwise. The holder carriage 5 is set at the cassette insertion and removal position as shown in FIG. 7 when turned by the elastic force, and it is set at the recording and reproducing position as shown in FIG. 6 when turned against the elastic force of the spring. The holder carriage 5 is held at the recording and reproducing position with a roller 52 of the holder carriage 5 engaged with the hook 26 of a lock lever 10. The lever 10 is rotatable about a shaft 21 mounted on the side chassis 4, and it is urged to engage with the roller 52 by a spring 22. The turn of the lever 10 is limited by a bent part 4b of the side chassis 4. The lock lever 10 is operated in association with an ejecting member. Upon operation of the ejecting member, the lock lever 10 is turned against the elastic force to disengage from the roller 52. When the holder carriage 5 is turned against the elastic force, the roller 52 pushes the sloped surface of the hook 26 of the lock lever 10 thereby to turn the lock lever 10 against the elastic force, as a result of which the roller 52 is locked by the hook 26. A switch 32 is provided to detect when the lock lever 10 is turned in the direction of energization, so that the recording or reproducing operation and other operations are permitted only when the switch 32 detects the turning of the lock lever 10 in the direction of energization.

A rotary shaft 30 penetrates the side chassis 4. An eject arm 7 is fixedly mounted on the end portion of the rotary shaft inside the side chassis 4. Similarly, as shown in FIG. 5, a rotary shaft 31 is provided for the other side chassis 2 in alignment with the rotary shaft 30, and another eject arm 7 similar to the above-described one 7 is fixedly mounted on the rotary shaft 31. The eject arms 7 and 7 are best substantially at right angles, and their ends are connected with each other through a push member 7a. The push member 7a is laid near the rear end of the cassette holder 3. In inserting the cassette 200, the push member 7a is pushed by the front end of the cassette 200; and in ejecting it, the front end of the cassette 200 is pushed by the push member.

Figure 8:
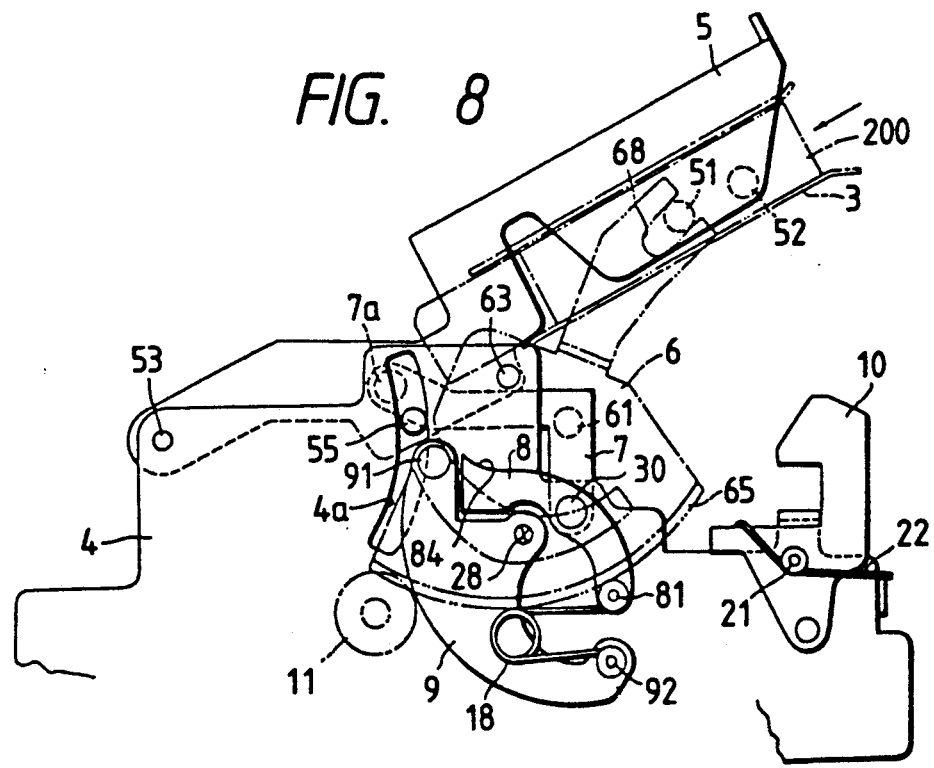
FIG. 8 is a side view of the magnetic tape cassette ejecting device with the magnetic tape cassette inserted at the cassette insertion and removal position.

The central portion of a fulcrum lever 8 is fixedly mounted on the end portions of the rotary shaft 30 outside the side chassis 4. The fulcrum lever 8 is substantially integral with the eject arm 7. A roller 61 is provided on the swing arm 6 in such a manner that it can abut against the side of one arm 84 of the fulcrum lever 8. The side chassis 4 is provided with a reversing lever 9 which is swingable about a shaft 28 located close to the above-described rotary shaft 30. The lever 9 has two arms. A roller 91 is provided at the end of one of the arms of the lever 9 in such a manner that it is engaged with a groove-shaped cam 67 formed in the swing arm 6. Both ends of a U-shaped reversing spring 18 are engaged with a spring hook 92 provided at the end of the other arm of the lever 9 and a spring hook 81 provided at the end of one arm of the fulcrum lever 8. The reversal point of the spring 18 is on the line 25 connecting the center of the rotary shaft 30 and the center of the spring hook 92. When the holder carriage 5 is at the recording and reproducing position as shown in FIG. 6, the spring hook 81 of the fulcrum lever 8 is on the left of the line 25, so that the reversing spring 18 tends to turn the lever 8 clockwise; however, the roller 61 of the swing arm 6 pushes the side 84 of the fulcrum lever 8 to limit the turning of the lever 8. On the other hand, the reversing lever 9 is urged to turn clockwise; however, the roller 91 abutting against the cam 67 of the swing arm 6 holds the lever 9 at rest. When the holder carriage 5 is at the cassette insertion and removal position as shown in FIG. 7, too, the spring hook 81 of the lever 8 is on the left of the above-described line 25, so that the lever is urged clockwise. However, when the cassette 200 is inserted into the cassette holder 3, its front end pushes the push member 7a of the eject arms 7, to turn the fulcrum lever 8 counterclockwise together with the eject arms 7 against the elastic force. As a result, the spring hook 81 of the lever 8 is moved to the right of the line 25, thus going over the reversing point of the reversing spring 18, so that the direction of energization is reversed, as a result of which the lever 8 is urged in the opposite direction by the reversing spring 18, thus being turned counterclockwise as shown in FIG. 8. Together with the lever 8, the eject arms 7 are also turned counterclockwise, so that the push member 7a is retracted from the path of the cassette 200. When, in association with the turn of the holder carriage 5, the swing arm 6 is turned from the recording and reproducing position as shown in FIG. 6 to the cassette insertion and removal position as shown in FIG. 7, the cam 67 of the swing arm 6 turns the reversing lever 9 clockwise with the aid of the roller 91 thereby to turn the above-described line 25 about the rotary shaft 30; however, in this operation, the line 25 will not go over the spring 81; and accordingly the reversal of the direction of energization due to the movement of the spring hook over the reversing point will not be caused.

The sector-shaped gear 65 of the swing arm 6 is coupled through a train of speed increase gears 11, 12, 13, 14 and 15 to a damper 16. The damper 16 is a kind of governor mechanism in which the rotor is brought into slide contact with the peripheral wall with its weight diverged by centrifugal force, thereby to control the speed of rotation, and has a function of one-way clutch giving a damper action only in one direction. Accordingly, when the holder carriage 5 is turned counterclockwise together with the swing arm 6, the damper 16 functions to cause the holder carriage 5 to turn gradually, thus lessening the impact which may occur.

The operation of the magnetic tape cassette ejecting device thus organized will be described.

When the holder carriage 5 is at the cassette insertion and removal position as shown in FIG. 7, the cassette 200 is inserted into the cassette holder 3. In this operation, the lock mechanisms 210 and 211 of the cassette 200 are struck against the embosses 3a of the cassette holder 3, thus being unlocked. As a result, the pawls 3b are abutted against the slide 205. As the cassette 200 is further inserted, the cassette body 201 is moved relative to the slide 205 so as to expose the opening 212. At the same time, the front cover 204 of the cassette 200 pushes the push member 7a of the eject arm 7, so that the ejection arms 7 and the fulcrum lever 8 substantially integral with the former 7 is turned counterclockwise against the elastic force of the reversing spring 18. As a result, the spring hook 81 of the fulcrum lever 8 goes across the line 25 as shown in FIG. 7, thus moving over the reversing point of the reversing spring 18. Therefore, the ejection arms 7 are turned in the opposite direction; i.e., counterclockwise, so that the push member 7a is spaced away from the cassette 200 as shown in FIG. 8. Thus, the cassette 200 has been loaded in the cassette holder 3.

When the holder carriage 5 is depressed with the cassette 200 inserted in the cassette holder 3, the holder carriage 5 is turned clockwise about the shaft 53 in FIG. 8, with the result that swing arm 6 is turned clockwise through the roller 51 and the fork 68 against the elastic force of the spring 24, and therefore the torque of the swing arm 6 is transmitted through the sector-shaped gear 65 and the train of gears 11, 12, 13, 14, and 15 to the damper 16. However, when the holder carriage is turned clockwise, the damper 16 does not operate. Owing to the engagement of the roller 91 and the cam 67 of the swing arm 6, the reversing lever 9 is turned counterclockwise as the swing arm 6 turns. As a result, the line 25 connecting the center of the spring hook 92 and the rotary shaft 30 swings counterclockwise, thus going over the spring hook 81 of the fulcrum lever 8. Accordingly, the reversing spring 18 moves over the reversing point, so that the reversing lever 8 is turned clockwise by the reversing spring 18. However, it should be noted that, when the swing arm 6 is turned as described above, the roller 61 pushes the side 84 of the reversing lever 8, to limit the rotation of the swing arm 6 and the eject arm 7.

Thus, the holder carriage 5 has been turned downwardly with the cassette 200 in the cassette holder 3, and the roller 52 has been locked by the hook 26 of the lock lever 10; that is, the holder carriage 5 has been set at the recording and reproducing position as shown in FIG. 6. In this operation, the front cover 204 of the cassette 200 is opened by suitable means, to expose the magnetic surface of the magnetic tape T; and the reel shafts are inserted into the holes 3c of the cassette holder 3 and engaged with the reel hubs in the cassette 200, while the pinch roller and other guides are inserted into the opening 212. With the holder carriage at the recording and reproducing position, the magnetic tape T is pulled out of the cassette 200 and wound on the rotary cylinder over a predetermined angle by a suitable tape loading mechanism. Thus, the recording or reproducing operation can be started. The cassette 200 is positioned with a suitable positioning pin. There is provided an over stroke for the holder carriage 5 so that the latter 5 can turn downwardly after the cassette 200 is positioned. That is, the cassette 200 is urged downwardly by the springs interposed between the holder carriage 5 and the cassette holder 3, so that it is positively positioned.

The cassette 200 is ejected as follows: The ejecting member is operated to turn the lock lever 10 counterclockwise against the elastic force, to unlock the holder carriage 5. The holder carriage 5 is turned counterclockwise through the cam 67 and the roller by the swing arm 6 which is urged by the spring 24, as a result of which the holder carriage 5 is set at the cassette insertion and removal position as shown in FIG. 7. In this operation, the damper 16 acts to cause the holder carriage to turn moderately. When the holder carriage 5 is turned towards the cassette insertion and removal position, the roller 61 of the swing arm 6 moves from the side 84 of the fulcrum lever 8, and accordingly the lever 8 and the eject arm 7 integral with the former 8 are turned clockwise by the elastic force of the reversing spring 18, as a result of which the push member 7a of the arm 7 pushes the cassette 200 at the end face, thus pushing the latter 200 out of the cassette holder 3. When the swing arm 6 is turned as described above, the reversing lever 9 is turned clockwise by the cam 67 of the swing arm 6. However, in this operation, the spring hooks 81 and 92 of the levers 8 and 9 which have been set close to each other as shown in FIG. 6 are moved away from each other as shown in FIG. 7, thus not going over the reversing point of the reversing spring 18, so that the ejection arms 7 and the lever 5 are maintained urged clockwise.

Let us consider the case where the holder carriage 5 is turned to the recording and reproducing position without the cassette 200. As the holder carriage 5 is turned, the swing arm 6 is turned clockwise. As a result, the roller 61 of the swing arm pushes the side 84 of the fulcrum lever 8, so that the lever 8 and the eject arms 7 are turned counterclockwise. As the swing arm 6 turns as described above, its cam 67 turns the reversing lever 9. Thus, the holder carriage 5 is set at the recording and reproducing position as shown in FIG. 6. If, under this condition, the ejection is carried out, then similarly as in the above-described ejecting operation, the holder carriage is set at the cassette insertion and removal position as shown in FIG. 7.

As was described above, in the embodiment, the reversing lever 9 is shifted according to the cassette insertion position, whereby the position of the one end of the reversing spring 18; that is, the position relative to the fulcrum lever is changed to cause the spring hook 81 to go over the reversing point of the reversing spring 18, and while the holder carriage 5 is moved to the recording and reproducing position with the cassette in it, the spring hook is caused to go over the reversing point of the reversing spring 18 again, so that the eject arms 7 are urged to eject the cassette. Therefore, the cassette can be inserted readily; that is, the operability is improved. Furthermore, in ejection, the cassette is pushed out; that is, the cassette can be removed with ease. In addition, it should be noted that the insertion and removal of the cassette can be achieved mechanically without using an electric motor, with the result that the manufacturing cost is reduced as much and the cassette can be quickly inserted and removed.

Figure 9:
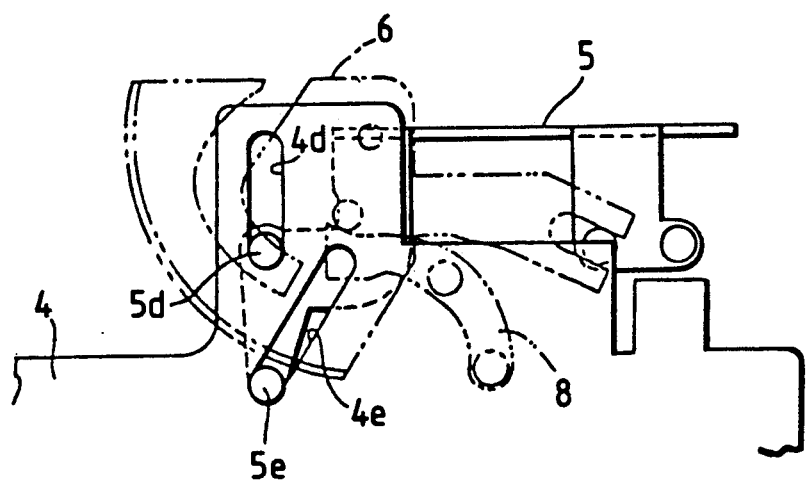
FIG. 9 is a side view showing one modification of the magnetic tape cassette ejecting device according to the invention.

In the above-described embodiment, the holder carriage 5 is swingable about the shaft 53. However, as shown in FIG. 9, it may be so modified that two guide pins 5d and 5e on the holder carriage 5 are slidably engaged with two grooves 4d and 4e formed in the side chassis 4, respectively. The groove 4d is vertical while the groove 4e is slanted so that the holder carriage 5 is moved between the cassette insertion and removal position and the recording and reproducing position. Alternatively, both of the grooves 4d and 4e may be formed vertical so that the holder carriage 5 makes parallel displacement. In the modifications, a mechanism for moving the swing arm 6 and the fulcrum lever 8 in association with the movement of the holder carriage 5 may be the same as that described above.

The technical concept of the invention is applicable to the general audio tape recorder or video tape recorder as well as a digital audio tape recorder.

As was described above, according to the invention, the reversing lever is displaced according to the cassette -insertion position so that the one end of the reversing spring is shifted, thus being moved over the reversing point, and in moving the holder carriage to the recording and reproducing position with the cassette in it, it is caused to move over the reversing point again, so that the eject arms are urged to eject the cassette. Therefore, the cassette can be inserted readily, and the operability is improved. In ejection of the cassette, the latter is pushed out; that is, the cassette can be removed with ease. Furthermore, the cassette can be inserted or removed mechanically without using a motor, with the results that the manufacturing cost can be reduced as much, and the cassette can be readily loaded or unloaded.

While there has been described in connection with the embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A magnetic tape cassette ejecting device for use with cassettes with openable front end covers comprising:

cassette holding means for holding a cassette, in which a magnetic tape is accommodated, so as to move said cassette between a magnetic tape recording/reproducing position and a cassette insertion/removal position;

cassette ejecting means for urging said cassette, while at said cassette insertion/removal position, in a direction outwardly from said cassette holding means, said cassette ejecting means being positioned at an inward location while at said magnetic tape recording/reproducing position so as to be positioned away from the openable cover;

energizing means for providing an energizing force for said cassette ejecting means; and energization direction reversing means comprising:
a swing arm which is turned in association with said cassette holding means;
a reversing lever which is pivoted by said swing arm; and a rotatable fulcrum lever, integral with said cassette rejecting means, coupled with said energizing means;

said energization direction reversing means for reversing the direction of energization of said cassette ejecting means provided by said energizing means while said cassette is being inserted in said cassette holding means, and reversing the direction of energization of said energizing means while said cassette holding means is being displaced from said cassette insertion/removal position to the magnetic tape recording/reproducing position.

2. A magnetic tape cassette ejecting device as claimed in claim 1, wherein said swing arm comprises a sector shaped gear meshed with a gear train which is coupled to a damper.

3. A magnetic tape cassette ejecting device as claimed in claim 1, wherein said energizing means comprises a reversing spring interposed between said fulcrum lever and said reversing lever.

4. A magnetic tape cassette ejecting device as claimed in claim 1, wherein said swing arm has a groove shaped cam surface, and said reversing lever is turned while being kept in contact with said cam surface.

5. A magnetic tape cassette ejecting device as claimed in claim 1, wherein said swing arm comprising a groove shaped cam for causing the reversing lever to turn, in order to turn the urging direction of said energizing means, when the cassette holding means is moved from the cassette insertion/removal position to the recording/reproducing position.

6. A magnetic tape cassette ejecting device for use with cassettes with openable front end covers comprising:

a cassette holder for holding a cassette in which a magnetic tape is accommodated;
a holder carriage for holding said cassette holder so as to move said cassette holder between a magnetic tape recording/reproducing position and a cassette insertion/removal position;
a swing arm which rotates about a shaft in association with said holder carriage, said swing arm having a cam;
a reversing lever engaged with said cam of said swing arm, to turn in association with the rotational motion of said swing arm;
an ejection arm for removing said cassette from said cassette holder;
a swingable fulcrum lever integral with said ejection arm; and a reversing spring interposed between said fulcrum lever and said reversing lever, said reversing spring (a) urging said ejection arm in a cassette removal direction when said holder carriage is at said cassette insertion/removal position, (b) urging said ejection arm in a direction opposite to said cassette removal direction when, during insertion of said cassette into said cassette holder, the front end of said cassette is brought into contact with said ejection arm to turn said ejection arm against the energizing force of said reversing spring, and (c) urging said ejection arm in the cassette removal direction when, said holder carriage has been moved to said magnetic tape recording/reproducing position.

7. A magnetic tape cassette ejecting device as claimed in claim 6, wherein said holder carriage holding said cassette holder is turned about a shaft provided on a chassis to move between said cassette insertion/removal position and said magnetic tape recording/reproducing position.

8. A magnetic tape cassette ejecting device as claimed in claim 6, wherein a straight line is formed between a swing center of said fulcrum lever and a first end of said reversing spring such that when a second end of said reversing spring connected to said fulcrum lever, crosses said straight line, the direction of energization force of said ejection arm switches.

9. A magnetic tape cassette ejecting device as claimed in claim 6, wherein said swing arm comprises a sector shaped gear meshed with a gear train which is coupled to a damper.

10. A magnetic tape cassette ejecting device as claimed in claim 6, wherein said cam has a groove shaped cam for causing the reversing lever to turn in order to turn the urging direction of said energizing means, when the cassette holding means is moved from the cassette insertion/removal position to the recording/reproducing position.

* * * * *